US011981542B2

(12) United States Patent
Sakai et al.

(10) Patent No.: US 11,981,542 B2
(45) Date of Patent: May 14, 2024

(54) HOISTING IMPLEMENT, HOISTING IMPLEMENT SYSTEM, AND METHOD FOR USING HOISTING IMPLEMENT SYSTEM

(71) Applicant: KOBELCO CONSTRUCTION MACHINERY CO., LTD., Hiroshima (JP)

(72) Inventors: Keiji Sakai, Hyogo (JP); Akira Koyahata, Hyogo (JP); Hiroshi Nakashioya, Hyogo (JP)

(73) Assignee: KOBELCO CONSTRUCTION MACHINERY CO., LTD., Hiroshima (JP)

(*) Notice: Subject to any disclaimer, the term of this patent is extended or adjusted under 35 U.S.C. 154(b) by 443 days.

(21) Appl. No.: 17/419,998

(22) PCT Filed: Nov. 27, 2019

(86) PCT No.: PCT/JP2019/046414
§ 371 (c)(1),
(2) Date: Jun. 30, 2021

(87) PCT Pub. No.: WO2020/144962
PCT Pub. Date: Jul. 16, 2020

(65) Prior Publication Data

US 2022/0073318 A1 Mar. 10, 2022

(30) Foreign Application Priority Data

Jan. 7, 2019 (JP) ................................ 2019-000647

(51) Int. Cl.
*B66C 1/12* (2006.01)
*B66C 1/66* (2006.01)
(Continued)

(52) U.S. Cl.
CPC .................. *B66C 1/12* (2013.01); *B66C 1/66* (2013.01); *B66C 13/08* (2013.01); *B66C 23/365* (2013.01)

(58) Field of Classification Search
CPC .... B66C 1/12; B66C 1/66; B66C 1/68; B66C 13/08; B66C 23/365
(Continued)

(56) References Cited

U.S. PATENT DOCUMENTS 2,020,306 A * 11/1935 Fitch ......................... B66C 1/12 254/296
3,709,548 A * 1/1973 Hogshead ............... B66C 1/125 294/82.12
(Continued)

FOREIGN PATENT DOCUMENTS

FR 3 014 422 A1 6/2015
JP 55-120673 U 8/1980
(Continued)

OTHER PUBLICATIONS

International Search Report dated Feb. 25, 2020 in PCT/JP2019/046414 filed on Nov. 27, 2019, 2 pages.
(Continued)

*Primary Examiner* — Paul T Chin
(74) *Attorney, Agent, or Firm* — Oblon, McClelland, Maier & Neustadt, L.L.P.

(57) ABSTRACT

Provided is a hoisting implement which can change a hoisting posture of a long object with a simple and lightweight configuration and minimize a possibility of occurrence of operational errors. The hoisting implement includes a first connection part and a second connection part disposed so that a center of gravity comes between the first connection part and the second connection part along the longitudinal direction of the long object. The first connection part allows
(Continued)

a first end of the hoist rope to be fixed to the long object. The second connection part includes a link having a distal portion to which a second end of the hoist rope is allowed to be connected, a swing supporting portion fixed to the long object to swingably support the link about a proximal portion of the link, and a holding portion that detachably holds the distal portion of the laid link.

8 Claims, 7 Drawing Sheets

(51) Int. Cl.
*B66C 13/08* (2006.01)
*B66C 23/36* (2006.01)

(58) Field of Classification Search
USPC .................................. 294/81.3, 82.12, 82.13
See application file for complete search history.

(56) References Cited

U.S. PATENT DOCUMENTS

| | | | | |
|---|---|---|---|---|
| 3,897,097 | A * | 7/1975 | Davis, Jr. | B66C 13/08 294/81.4 |
| 4,909,555 | A * | 3/1990 | Blasi | A22B 5/06 294/81.21 |
| 5,803,520 | A * | 9/1998 | Bagrowski, III | B66C 1/16 294/93 |
| 6,081,573 | A * | 6/2000 | Akimoto | B66C 1/10 376/254 |
| 6,142,546 | A | 11/2000 | Hansort | |
| 8,434,799 | B2 * | 5/2013 | Reger | B66C 1/10 294/82.12 |
| 9,359,174 | B2 * | 6/2016 | Stitt | B66C 1/10 |
| 10,227,218 | B1 * | 3/2019 | Stone | E04G 21/147 |
| 10,633,223 | B1 * | 4/2020 | Cain | B66C 1/12 |

FOREIGN PATENT DOCUMENTS

| | | | |
|---|---|---|---|
| JP | 8-301574 | A | 11/1996 |
| JP | 10-25086 | A | 1/1998 |
| JP | 2001-139278 | A | 5/2001 |
| JP | 3213085 | U | 10/2017 |
| JP | 2017-197375 | A | 11/2017 |

OTHER PUBLICATIONS

Extended European Search Report dated Feb. 9, 2022 in corresponding European Patent Application No. 19909321.2, 7 pages.

* cited by examiner

HOISTING IMPLEMENT, HOISTING IMPLEMENT SYSTEM, AND METHOD FOR USING HOISTING IMPLEMENT SYSTEM

TECHNICAL FIELD

The present invention relates to a hoisting implement, a hoisting implement system, and a method for using the hoisting implement system.

BACKGROUND ART

Long objects, such as gantries and masts of construction machines, are removed from the machine bodies of the construction machines when transported under laws and regulations, and then after the transportation, attached again to the construction machines. In the operation of removing or attaching such a long object, in order to avoid the hoisted load touching and hitting an operator, the long object needs to be hoisted at its center of gravity to stabilize the posture when lifted off the ground.

An exemplary case in which the mast is transported and then attached to a machine body of a construction machine will be specifically described in detail. First, the mast that is detached from the machine body of the construction machine and transported by a trailer is unloaded from the trailer. Since the loading surface of the loading platform of the trailer is generally horizontal, the mast is lifted off the loading platform in a horizontal posture. The mast unloaded from the loading platform is temporarily placed on the ground, and then attached to the machine body of the construction machine. Since the mast is tilted when attached to the machine body and is used, the mast that has been placed on the ground before being attached to the machine body is lifted off the ground in a tilted posture.

As described above, the mast needs to be stabilized in different postures (tilt angles) depending on the situation of hoisting. In a method of changing the posture of the hoisted mast, for example as illustrated in FIG. 1, two pairs of hoist rings 101 (first hoist rings 101*a* and second hoist rings 101*b*) are provided at different longitudinal positions on the top face of a mast 100 and the places where shackles, for connecting hoist wires to the mast, are changed between the two pairs of hoist rings 101. Specifically, the shackles are connected to the first hoist rings 101*a* to lift the mast off the ground in a horizontal posture and to the second hoist rings 101*b* to lift the mast off the ground in a tilted posture.

To change the hoisting posture of the mast, work is needed for detaching and attaching the shackles. For a large construction machine, the shackle for hoisting the mast is as heavy as about 10 kg, which requires a heavy work load of an operator for detaching and attaching the shackle as well as a long work time and a wide work space. This reduces the efficiency of work. Moreover, since there are a plurality of locations to which the shackles are attached, the operator may mistakenly attach a shackle to a wrong location in the operation of detaching and attaching the shackles.

As a method for efficiently changing the posture of a long object, such as a mast, during hoisting, Patent Literature 1 proposes a hoisting implement including a pull-in device that changes the length of a hoist wire. In this hoisting implement, a hoisting balance device for lifting a long object includes the pull-in device. The pull-in device pulls in or feeds out a wire to create a difference in length between the front and rear wires hoisting the long object, thereby changing the tilt of the long object.

Although this hoisting implement requires no work for detaching and attaching shackles, the pull-in device needs to be attached to the hoisting balance device, which results in a complex structure and an increase in weight. In addition, since the length of the wire needs to be selected as required for the long object and its angle by which the long object is hoisted, the possibility of occurrence of operational errors is not always reduced.

CITATION LIST

Patent Literature

Patent Literature 1: JP H10-25086 A

SUMMARY OF INVENTION

An object of the present invention is to provide a hoisting implement and a hoisting implement system that can change, by a simple configuration, a hoisting posture of a long object and minimizes a possibility of occurrence of operational errors, and to provide a method for using the hoisting implement system.

The present invention provides a hoisting implement used for hoisting a long object to be mounted on a construction machine using a hoist rope including a first end and a second end, the hoisting implement including at least one set of a first connection part and a second connection part disposed on the long object so that a center of gravity of the long object comes between the first connection part and the second connection part along a longitudinal direction of the long object, the first connection part and the second connection part each allowing the hoist rope to be connected to the long object, wherein the first connection part is fixed to the long object so that the first end of the hoist rope is connected to the first connection part, and the second connection part includes a link having a distal portion to which the second end of the hoist rope is allowed to be connected, and a proximal portion opposite to the distal portion, a swing supporting portion fixed to the long object to swingably support the proximal portion of the link, and a holding portion capable of detachably holding the distal portion of the link laid against the long object along the longitudinal direction of the long object.

DESCRIPTION OF EMBODIMENT

A hoisting implement, a hoisting implement system, and a method for using the hoisting implement system according to one embodiment of the present invention will be described with reference to the drawings as required.

Figure 1:
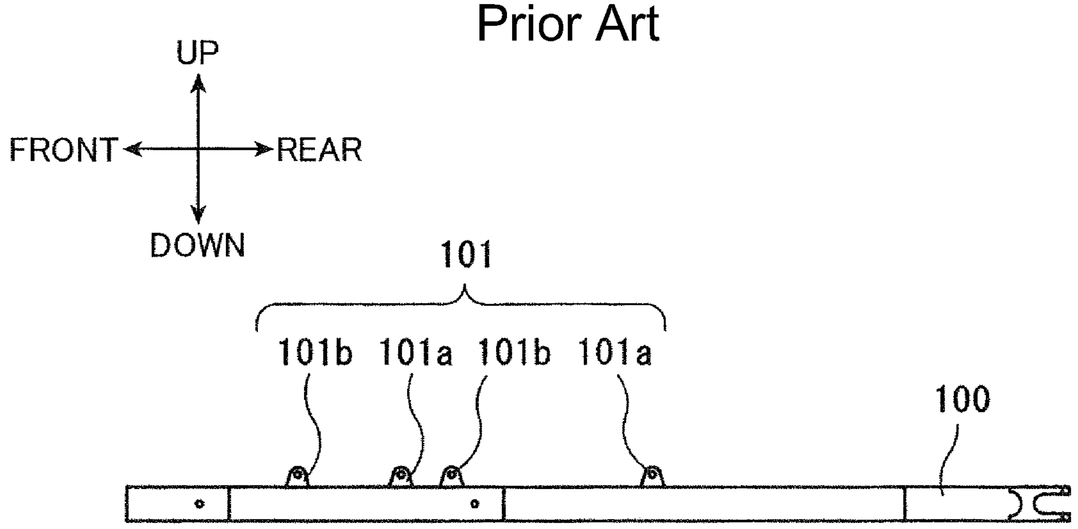
FIG. 1 Prior Art
FIG. 1 is a schematic side view illustrating a conventional hoisting implement.
Figure 2:
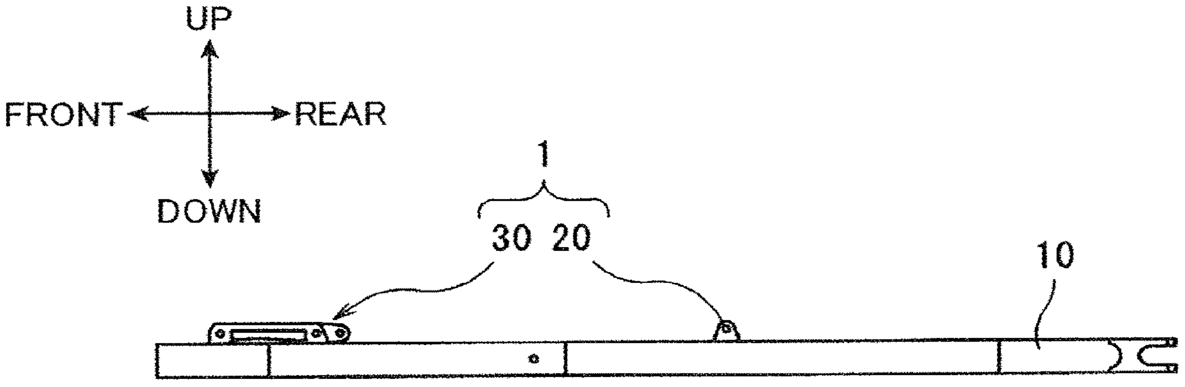
FIG. 2 is a schematic side view illustrating a hoisting implement according to one embodiment of the present invention.
Figure 3:
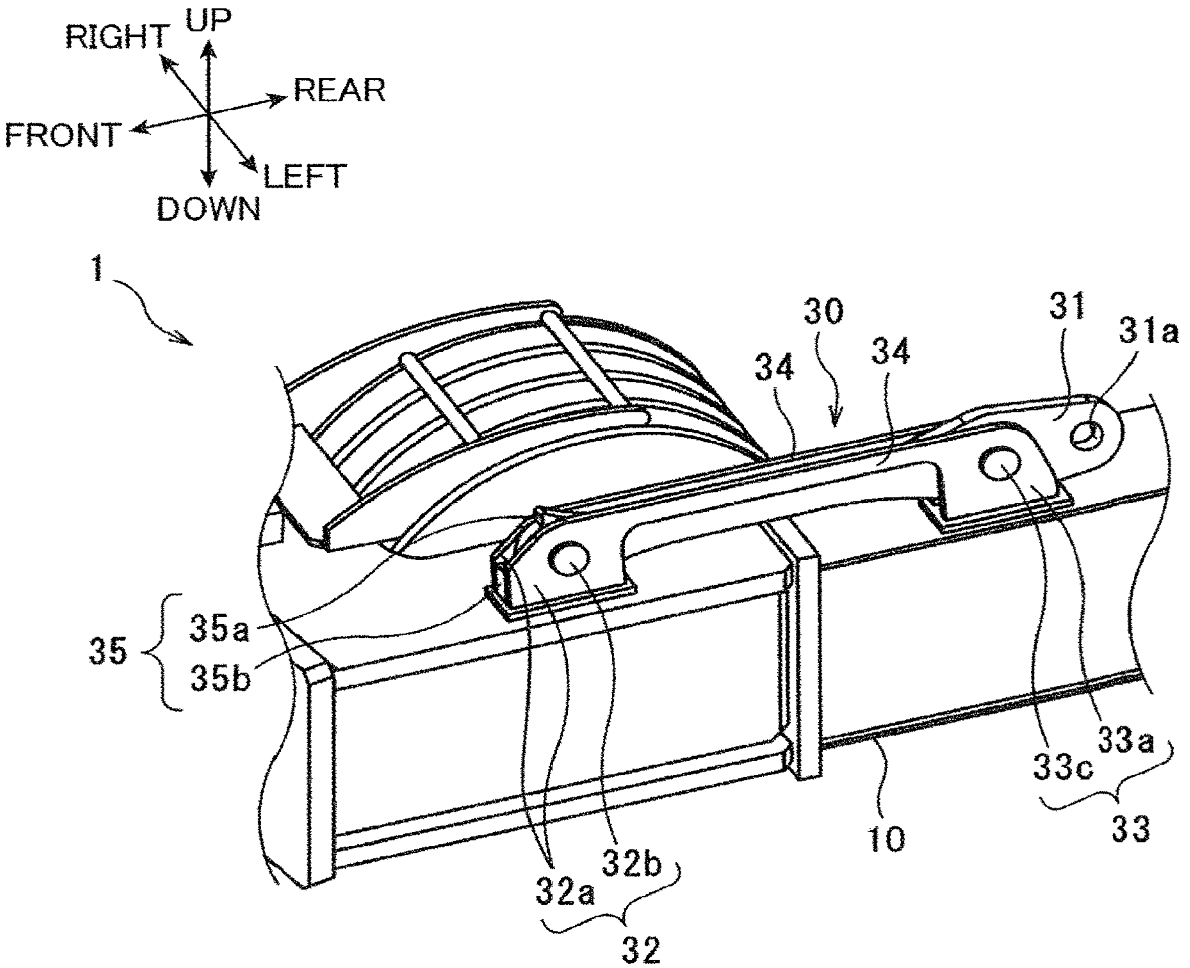
FIG. 3 is a schematic perspective view illustrating a second connection part illustrated in FIG. 2 with a link fixed.
Figure 4:
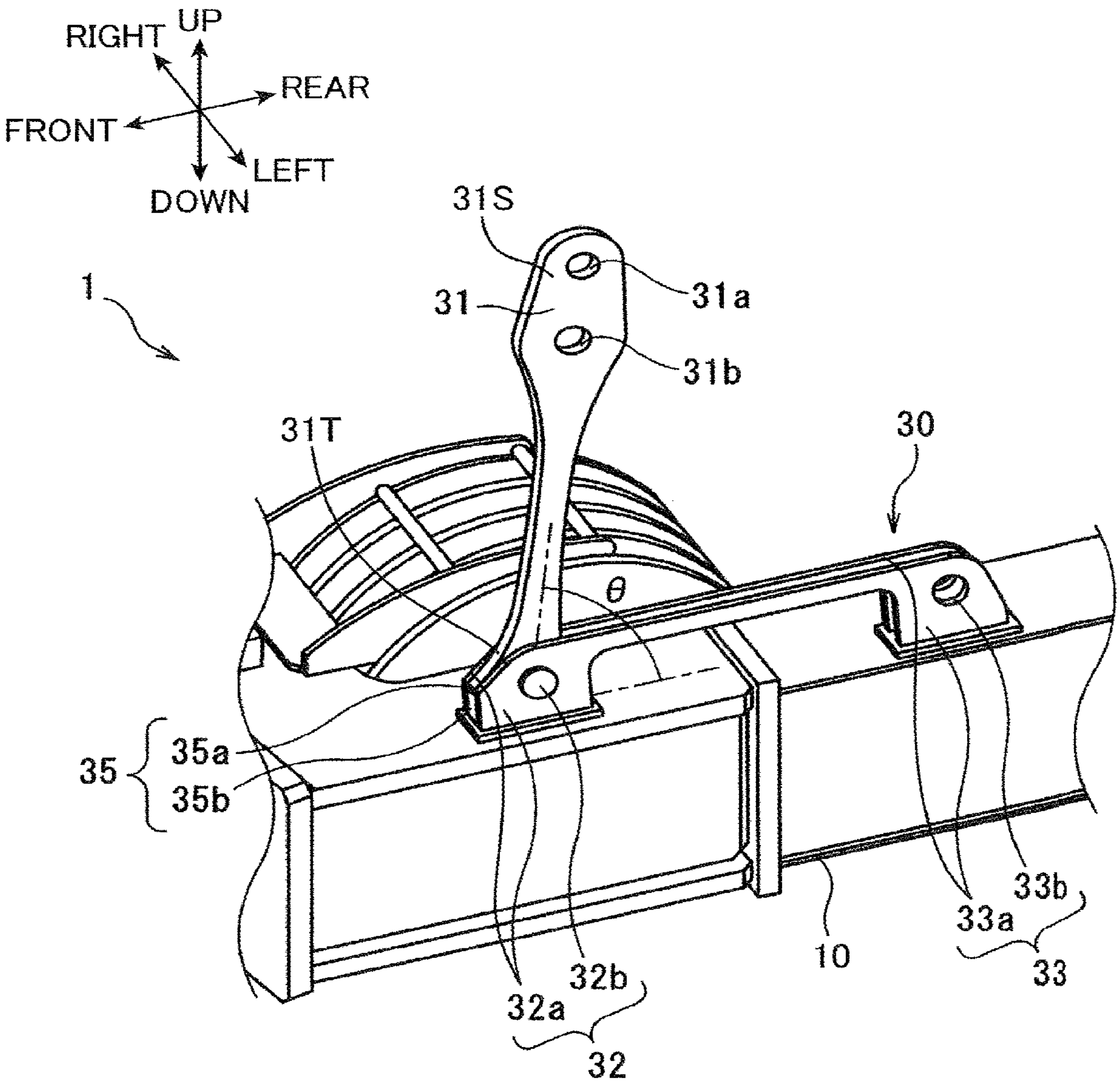
FIG. 4 is a schematic perspective view illustrating the second connection part illustrated in FIG. 2 with the link allowed to swing.
Figure 5:
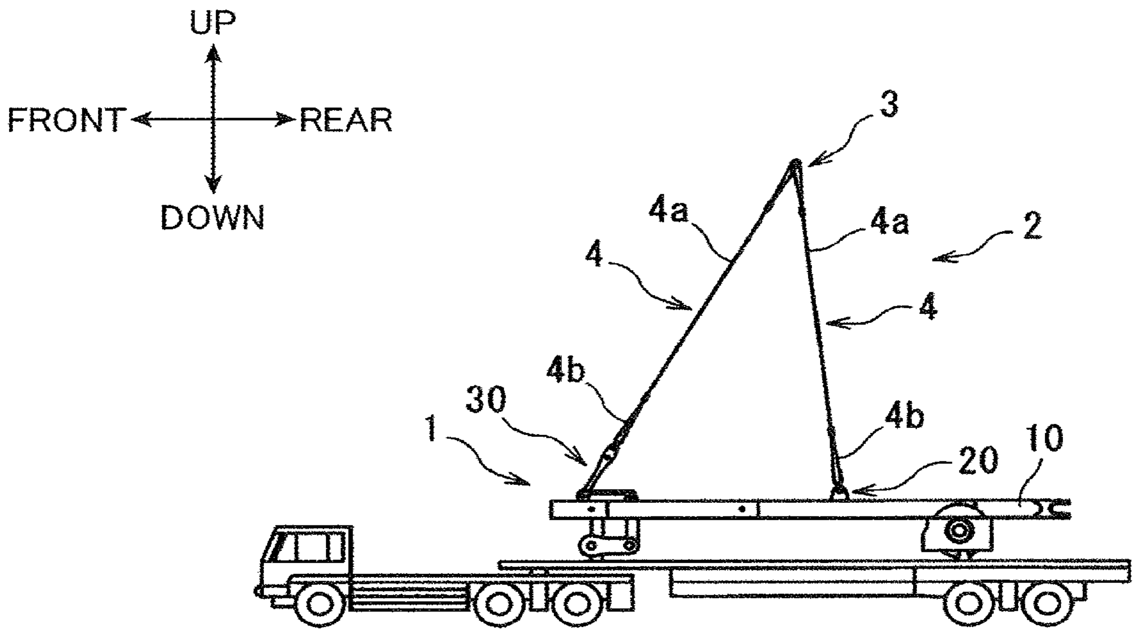
FIG. 5 is a schematic side view illustrating a hoisting implement system according to one embodiment of the present invention, where a mast is to be unloaded from a trailer.

A hoisting implement 1 illustrated in FIGS. 2 to 4 is a hoisting implement used for hoisting a mast 10, which is a long object to be mounted on a construction machine by a hoist rope (see a hoist rope 4 in FIG. 5). The hoisting implement 1 can preferably be used, in particular, for the mast 10. The hoist rope 4 includes a first end and a second end opposite to the first end. In the drawings, the front-rear direction, the up-down direction, and the right-left direction are indicated with reference to a cab (not shown) of the construction machine on which the mast 10 is mounted. These directions are indicated for convenience of explanation, and do not limit the present invention.

The hoisting implement 1 includes a pair of first connection parts 20 and a pair of second connection parts 30 provided on the top face side of the mast 10 so that the center of gravity of the mast 10 comes between a pair of first connection parts 20 and a pair of second connection parts 30 along the longitudinal direction of the mast 10. A pair of first connection parts 20 is disposed at both sides of the mast 10 in the right-left direction so as to overlap each other in a side view along the right-left direction, and a pair of second connection parts 30 is disposed in the same way. With a pair of first connection parts 20 and a pair of second connection parts 30 each disposed at both sides of the mast 10 so that the connection parts constituting a pair overlap each other in the side view, the mast 10, which is wide in the width direction, can be hoisted in a stable manner. Note that, in FIGS. 2 to 4, only one of the first connection parts 20 and one of the second connection parts 30 are illustrated. Alternatively, for example, the hoisting implement 1 may include the first connection part 20 and the second connection part 30 (at least one set of the first connection part 20 and the second connection part 30) each disposed at a central portion, in the width direction, of the mast 10. In the embodiment, in the right-left direction, the first connection part 20 and the second connection part 30 disposed in the right side of the mast 10 are defined as the first connection part 20 and the second connection part 30 of a first set, and the first connection part 20 and the second connection part 30 disposed in the left side of the mast 10 are defined as the first connection part 20 and the second connection part 30 of a second set.

These first connection parts 20 and second connection parts 30 are disposed spaced apart from each other along the longitudinal direction of the mast 10. When the distance between the first connection parts 20 and the second connection parts 30 is too short, the hoisted mast 10 may easily swing. Thus, the distance is preferably determined in such a value that the mast 10 is hoisted in a stable manner.

Either the first connection part 20 or the second connection part 30 may be disposed further in the front side. Whether to dispose the first connection part 20 or the second connection part 30 further in the front side is suitably determined according to the tilt angle of a long object set for a case where a link 31, to be described later, is swingable (hereinafter, referred to as "swingable state") and a case where the link 31 is laid and fixed (hereinafter, referred to as "fixed state"). Specifically, the portion of the mast 10 where the second connection part 30 is disposed is lowered by changing the state of the link 31 from the fixed state to the swingable state. FIG. 2 illustrates the configuration in which the second connection part 30 is located in the front side. Although description will be made based on the configuration in FIG. 2, the same applies for a configuration in which the second connection part 30 is located in the rear side.

The first connection part 20 is configured to fix a first end of the hoist rope 4 to the mast 10. That is, the first connection part 20 is fixed to the mast 10 and allows the first end of the hoist rope 4 to be attached to the first connection part 20. Specifically, like a known hoist ring, for example, the first connection part 20 protrudes from the top face side of the mast 10 and has a through hole penetrating therethrough in the width direction of the mast 10.

The second connection part 30 includes the link 31, a swing supporting portion 32, a fixing member 33 (holding portion), a pair of guides 34, and a stopper 35.

The link 31 is a bar-like or plate-like member having a predetermined length. The link 31 preferably has a plate-like shape. The plate-like link 31 is easily guided by a pair of guides 34, to be described later. The length of the link 31 is determined so that the mast 10 is desirably tilted (including the horizontal state) when the link 31 is in the swingable state.

The link 31 includes a distal portion 31S, and a proximal portion 31T opposite to the distal portion 31S (FIG. 4). The second end of the hoist rope 4 can be attached to the distal portion 31S. Specifically, a first through hole 31*a* is formed in the distal portion 31S of the link 31 to penetrate the distal portion 31S in the width direction (right-left direction) of the mast 10. The distal portion 31S is a portion of the link 31 further in the distal side than the proximal portion 31T.

The proximal portion 31T of the link 31 is supported by the swing supporting portion 32, described later.

The swing supporting portion 32 is fixed to the mast 10 and supports the proximal portion 31T of the link 31 so as to be swingable about a swing central axis extending in the right-left direction.

The configuration of the swing supporting portion 32 is not particularly limited. For example, as illustrated in FIGS. 3 and 4, the swing supporting portion 32 may be configured to include a pair of plate-like parts 32*a* protruding from the top face of the mast 10 so as to sandwich the proximal portion 31T of the link 31, and a shaft portion 32*b* penetrating a pair of plate-like parts 32*a* and the proximal portion 31T of the link 31.

The fixing member 33 attaches and detaches the distal portion 31S of the laid link 31 to and from the mast 10. In more detail, with the link 31 laid against the mast 10 along the longitudinal direction of the mast 10, the fixing member 33 detachably holds the distal portion 31S of the link 31.

The configuration of the fixing member 33 is not particularly limited. For example, as illustrated in FIGS. 3 and 4, the fixing member 33 includes a pair of plate-like parts 33*a* protruding from the top face of the mast 10 so as to sandwich the distal portion of the link 31, through holes 33*b* penetrating the pair of plate-like parts 33*a*, a second through hole 31*b* provided in the link 31 so as to overlap the through holes 33*b* of the plate-like parts 33*a* in the side view when the link 31 is laid, and a fixing pin 33*c* that penetrates and fixes together, in a state where the link 31 is laid, the through holes 33*b* of the plate-like parts 33*a* and the second through hole 31*b* of the link 31. In this configuration, the distal portion 31S of the link 31 can be attached to and detached from the mast 10 by inserting and removing the fixing pin 33*c*.

In the side view, the fixing member 33 is located further to the center of gravity of the mast 10 from the swing supporting portion 32. That is, the fixing member 33 is located closer to the center of gravity of the mast 10 than the swing supporting portion 32 is along the longitudinal direction. Accordingly, when the link 31 is allowed to swing, the distal portion 31S of the link 31 is kept stable toward the center of gravity. When the fixing member 33 is located further to the center of gravity of the mast 10 from the swing supporting portion 32 in the side view as described above, the swing angle (θ in FIG. 4) of the link 31 from the top face of the mast 10 will be less than 90°. Thus, for example, when the mast 10 is placed on the ground and the hoist rope 4 is loosened, the link 31 easily returns under its own weight toward the fixing member 33, that is, to the position in which the distal side of the link 31 can be fixed to the mast 10. This makes it easy to fix the distal side of the laid link 31 to the mast 10.

Each of a pair of guides 34 has a form of a plate. A pair of guides 34 is provided upright on a portion of the mast 10 between the swing supporting portion 32 and the fixing member 33. A pair of guides 34 is provided to oppose each other along a direction perpendicular to the longitudinal direction (along the right-left direction). A pair of guides 34 contacts the laid link 31, so as to sandwich the link 31 from both the right-and-left sides. With the second connection part 30 including the plate-like guides 34, the link 31 swinging toward the laid position is guided by the guides 34. This makes it easy to fix the distal side of the laid link 31 to the mast 10.

The configuration of a pair of guides 34 is not particularly limited. For example, as illustrated in FIGS. 3 and 4, the a pair of guides 34 may include plate-like members each extending from one of a pair of plate-like parts 32*a* of the swing supporting portion 32 to one of a pair of plate-like parts 33*a* of the fixing member 33, the plate-like members sandwiching the link 31 from both sides. In this configuration, the guides 34 can integrally be formed with the plate-like part 32*a* of the swing supporting portion 32 and the plate-like part 33*a* of the fixing member 33 to increase the strength of the second connection part 30.

The stopper 35 restricts the angle θ by which the link 31 swings from the top face of the mast 10 (the maximum rising angle from the mast 10) to 90° or less relative to the fixing member 33 side. Even when the fixing member 33 is located further to the center of gravity of the mast 10 from the swing supporting portion 32 in the side view, when the link 31 is allowed to swing, the swing angle of the link 31 from the top face of the mast 10 may incidentally exceed 90°. In such a case, it is difficult for the link 31 to swing back toward the fixing member 33 under its own weight. In this regard, providing the second connection part 30 with the stopper 35 described above prevents the swing angle θ of the link 31 from exceeding 90°, and further reliably allows the link 31 to easily return to the position where the distal portion 31S of the link 31 can be fixed to the mast 10. This makes it further easier to fix the distal portion 31S of the laid link 31 to the mast 10.

The configuration of the stopper 35 is not particularly limited. For example, as illustrated in FIGS. 3 and 4, the stopper 35 may be configured to include a link projection 35*a* protrudingly provided on an upper portion of the proximal side of the link 31, and a swing supporting portion projection 35*b* that is provided between a pair of plate-like parts 32*a* of the swing supporting portion 32 to protrude from the top face of the mast 10 and restricts swinging of the link 31 by making contact with the link projection 35*a*.

Note that, in the configuration illustrated in FIGS. 3 and 4, for example, the upper limit of the swing angle θ to which the swinging of the link 31 is restricted is 90°. Meanwhile, the lower limit of the swing angle θ to which the swinging of the link 31 is restricted is not particularly limited. However, the lower limit of the swing angle θ is such an angle that at least the mast 10 is allowed to tilt desirably when the link 31 is in the swingable state. When the swing angle θ of the link 31 is restricted below the lower limit, the stopper 35 might restrict swinging of the link 31 before the tilt of the mast 10 reaches the desirable tilt.

In the hoisting implement 1, the link 31 of the second connection part 30 is swingable about the proximal portion 31T and thereby serves as a portion of the hoist rope 4. This is equivalent to the hoist rope 4 given a longer length. Meanwhile, the hoisting implement 1 allows the distal portion 31S of the laid link 31 to be fixed to the mast 10. In the hoisting implement 1, when the link 31 is laid and fixed, the link 31 does not serve as a portion of the hoist rope 4, and thus the length of the hoist rope 4 is its actual length. That is, the hoisting implement 1 can change the hoisting posture of the mast 10 by changing the equivalent length of the hoist rope 4, which change is made by switching the state of the link 31 between the swingable state and the fixed state. In addition, in the hoisting implement 1, the hoisting posture of the mast 10 can be changed while the hoist rope 4 is kept fixed to the distal portion 31S of the link 31, which requires no operation of detaching and attaching the hoist rope 4, and therefore the operator only needs to select either allowing the swinging of the link 31 or fixing the link 31. This is an easy operation and can prevent occurrence of operational errors. Furthermore, the hoisting implement 1 is configured with the first connection part 20 that allows the first end of the hoist rope 4 to be fixed to the mast 10, and the second connection part 30 including the link 31. Thus, the hoisting implement 1 has a simple structure and is light in weight.

Figure 6:
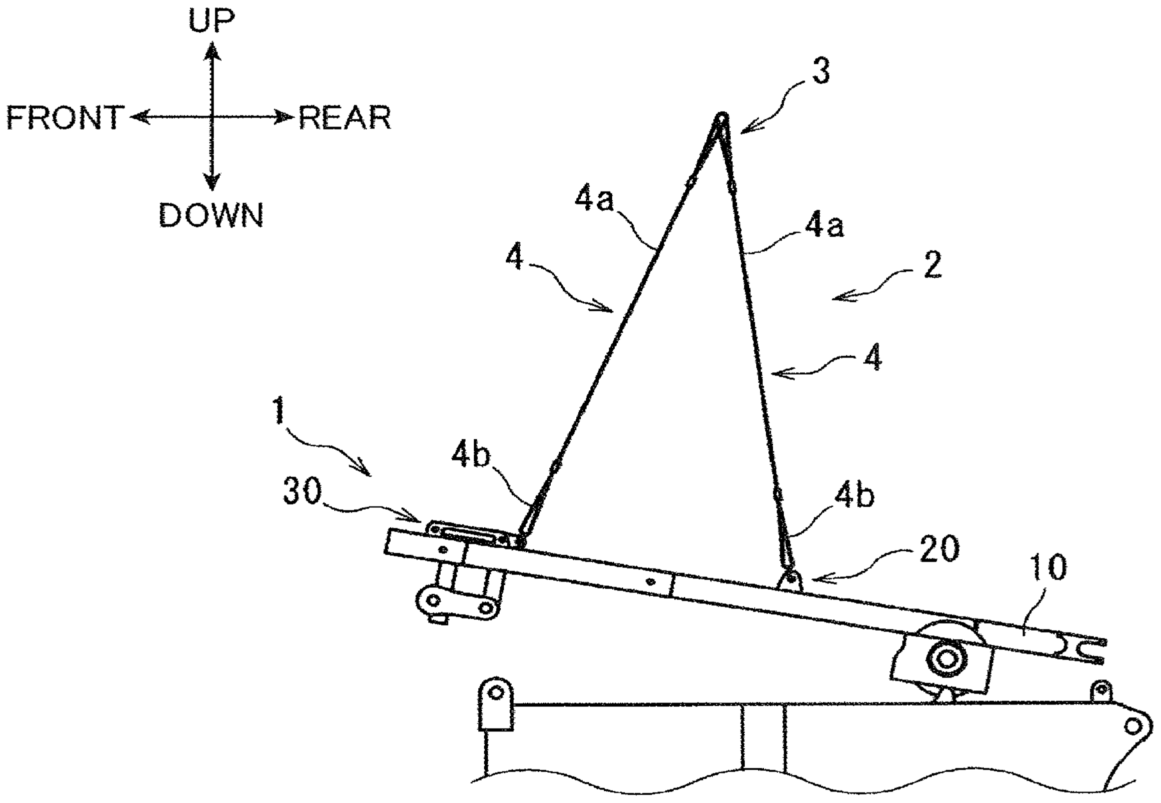
FIG. 6 is a schematic side view illustrating the hoisting implement system illustrated in FIG. 5, where the mast is being mounted on a machine body of a construction machine.

A hoisting implement system 2 illustrated in FIGS. 5 and 6 is a hoisting implement system for hoisting the mast 10, which is to be mounted on a construction machine, using a predetermined hoisting device and the hoist rope 4. The hoisting implement system 2 includes a hoisting tool 3, the hoisting implement 1, and a pair of hoist ropes 4.

The hoisting tool 3 is a device for hoisting a heavy object while keeping the balance of the heavy object, and serves as the origin point of hoisting. That is, the hoisting implement system 2 lifts up the hoisting tool 3 to hoist the heavy object while keeping the balance of the heavy object. The hoisting tool 3 used in the hoisting implement system 2 is not particularly limited. For example, a hook itself of a crane (hoisting device or auxiliary crane) that hoists a long object or a known hoisting balance device may be used as the hoisting tool 3. When a hoisting balance device is used as the hoisting tool 3, the hoisting balance device is suspended, for example, from a hook of a crane. That is, the hoisting tool 3 is connected to the hoisting device.

Since the hoisting implement 1 of the hoisting implement system 2 is a hoisting implement according to one embodiment of the present invention illustrated in FIGS. 2 to 4, the corresponding component will be appended with the same reference sign and description thereof is omitted.

A pair of hoist ropes 4 connects between the hoisting tool 3 and the first connection part 20 of the hoisting implement 1 and between the hoisting tool 3 and the second connection part 30 of the hoisting implement 1. In the hoisting implement 1, a pair of first connection parts 20 is disposed at both sides of the mast 10 so as to overlap each other in the side view, and a pair of second connection parts 30 is disposed in the same way. A pair of hoist ropes 4 is provided for the first connection part 20 and the second connection part 30 disposed in the same side of the mast 10 in the width direction.

The hoist ropes 4 may consist of a first hoist rope connecting between the hoisting tool 3 and the first connection part 20 and a second hoist rope connecting between the hoisting tool 3 and the second connection part 30 or alternatively, consist of a single rope connecting between the first connection part 20 and the second connection part 30 via the hoisting tool 3.

The configuration of the hoist rope 4 is not particularly limited. For example, as illustrated in FIGS. 5 and 6, the hoist rope 4 may include wires 4*a*, and shackles 4*b* provided at ends of the wires 4*a* that are to be connected to the first connection part 20 and the second connection part 30.

In the hoisting implement system 2, the distance between the hoisting tool 3 and the first connection part 20 of the hoisting implement 1 is equal to the distance between the hoisting tool 3 and the second connection part 30 of the hoisting implement 1 when the mast 10 is hoisted. That is, the length of the portion of the hoist rope 4 connecting between the hoisting tool 3 and the first connection part 20 is equal to the length of the portion of the hoist rope 4 connecting between the hoisting tool 3 and the second connection part 30 (the first through hole 31*a* in the distal portion of the link 31).

In the hoisting implement system 2, the mast 10 is hoisted in a horizontal posture when the link 31 of the second connection part 30 is in the swingable state, and the mast 10 is hoisted in such a posture that the front side of the mast 10 is raised by a desired angle when the link 31 of the second connection part 30 is in the fixed state.

This configuration can be realized by adjusting the locations where the first connection parts 20 and the second connection parts 30 are disposed and the length of the link 31. Specifically, the adjustment can be made in the following steps. First, when the link 31 is in the fixed state, the locations at which the first connection part 20 and the second connection part 30 are disposed are determined so that the mast 10 is hoisted in such a posture that the front side of the mast 10 is raised by the desired angle. Then, when the link 31 is in the swingable state, the length of the link 31 is determined so that the mast 10 becomes horizontal. Actually, the locations at which the first connection part 20 and the second connection part 30 are disposed and the length of the link 31 may vary depending on the point from which the mast 10 is hoisted by the hoisting tool 3. Thus, the locations of the first connection part 20 and the second connection part 30 and the length of the link 31 are determined preferably using a simulation or the like taking into consideration the point from which the mast 10 is hoisted.

The hoisting implement system 2, using the hoisting implement 1 according to the present invention, can change the hoisting posture of the mast 10 with a simple and light-weight configuration. When the mast 10 is hoisted by the hoisting implement system 2, the distance between the hoisting tool 3 and the first connection part 20 of the hoisting implement 1 is equal to the distance between the hoisting tool 3 and the second connection part 30 of the hoisting implement 1. That is, the hoisting implement system 2, which can control the change in the hoisting posture of the mast 10 only by the length of the link 31, makes the operation, including adjustment of the length of the hoist rope 4, easy and thus can prevent occurrence of operational errors.

In the method for using the hoisting implement system according to one embodiment of the present invention uses the hoisting implement system 2 of the present invention illustrated in FIGS. 5 and 6. The method for using the hoisting implement system includes a step of connecting the hoist rope 4 to the hoisting implement 1 (connecting step, or hoist rope connecting step), a step of setting the link 31 to one of the swingable state in which the distal portion 31S is swingable about the proximal portion 31T and the fixed state in which the distal portion is fixed to the long object (link setting step), a step of hoisting and moving the long object after the link setting step (first moving step), a step of placing the long object on the ground after the first moving step (placing step), a step of switching, after the placing step, the state of the link 31 from the state set in the setting step to the other state among the swingable state and the fixed state (switching step), and a step of hoisting again and moving the long object after the switching step (re-movement step, or second moving step).

The method for using the hoisting implement system 2 will be described in detail for an exemplary case in which the mast 10 that has been loaded on a trailer and transported is to be attached to a construction machine body.

In a hoist rope connecting step, as illustrated in FIG. 5, the first end of the hoist rope 4 is fixed to the first connection part 20 of the hoisting implement 1, and the second end of the hoist rope 4 is fixed to the distal side of the link 31 of the second connection part 30. This work is done while the mast 10 is still on the trailer.

In a link setting step, as illustrated in FIG. 5, the link 31 is not fixed to the fixing member 33, that is, in the swingable state. That is, the link 31 is set in a state allowed to swing about its proximal side. The hoisting implement system 2 is designed such that, when the link 31 is in the swingable state as described above, the mast 10 is hoisted in the horizontal posture.

In a first moving step, the mast 10 is hoisted by the hoisting tool 3 from the trailer by which the mast 10 has been transported. Since the link 31 is in the swingable state, the hoisted mast 10 keeps the horizontal posture. When the mast 10 is hoisted, the swing angle θ of the link 31 is less than 90°.

In a placing step, the mast 10 that has been hoisted is placed on the ground. When the mast 10 is placed on the ground, the hoist rope 4 loosens. This causes the link 31 to swing under its own weight, moving the distal side toward the fixing member 33 along a pair of guides 34. In the present invention, the "ground" includes a ground-like place, for example, an upper face of a wood plate or a platform placed on the ground.

In a switching step, the distal portion of the link 31 that has moved to the fixing member 33 is fixed to the fixing member 33. That is, the state of the link 31 is switched to "the state in which its distal side is fixed to the mast 10" from the state different from the state that has been set in the setting step among "the state allowed to swing about its proximal side" and "the state in which its distal side is fixed to the mast 10".

Specifically, with the through holes 33*b* of the plate-like parts 33*a* of the fixing member 33 overlapping with the second through hole 31*b* of the laid link 31 in the side view, the fixing pin 33*c* is inserted therethrough to hold together the through holes 33*b* and the second through hole 31*b*. The link 31 is now in the fixed state.

In a second moving step, the mast 10 that has been placed on the ground is hoisted by the hoisting tool 3 and then attached to the construction machine body. Since the link 31 is in the fixed state, the mast 10 is hoisted with the front side of the mast 10 raised by a desired angle.

When attaching the mast 10 to the construction machine body is completed, the hoist ropes 4 are removed from the first connection part 20 and the second connection part 30 of the hoisting implement 1.

The case of attaching the mast 10, which has been transported, to the construction machine body is described above as an example. Removing the mast 10 from the construction machine body and then loading the mast 10 on the trailer can be made by conducting the steps described above in the reverse order.

That is, as illustrated in FIG. 6, after the hoist ropes 4 are connected to the hoisting implement 1 (connecting step), the link 31 is set to the fixed state so that the front side of the mast 10, when hoisted, is raised by the desired angle (link setting step), and then the mast 10 is removed from the construction machine (first moving step) and placed on the ground (placing step). After removing the fixing pin 33*c* of the fixing member 33 to set the link 31 to the swingable state (switching step), the mast 10 is hoisted (second moving step). Since the link 31 is in the swingable state, the mast 10 is hoisted in the horizontal posture. The mast 10 hoisted in the horizontal posture is loaded on the trailer.

The method for using the hoisting implement system uses the hoisting implement system 2 of the present invention to make the operation easy and prevent occurrence of operational errors.

The configuration of the present invention is not limited to the embodiment described above. It should be construed that, on the basis of the description in this specification and generally known art, the component of the parts of the embodiment described above may be omitted, substituted, or added, which all falls within the scope of the present invention.

The description on the embodiment is made for the case in which the hoisting implement and the hoisting implement system of the present invention are used for a mast. However, the hoisting implement and the hoisting implement system of the present invention are not only used for a mast but also applicable to other long objects of the construction machines, such as gantries.

The description on the embodiment is made for the case in which the second connection part of the hoisting implement includes a pair of guides. However, a pair of guides is not an essential component for the hoisting implement. The present invention also includes a hoisting implement that includes only a single guide or no guide.

Figure 7:
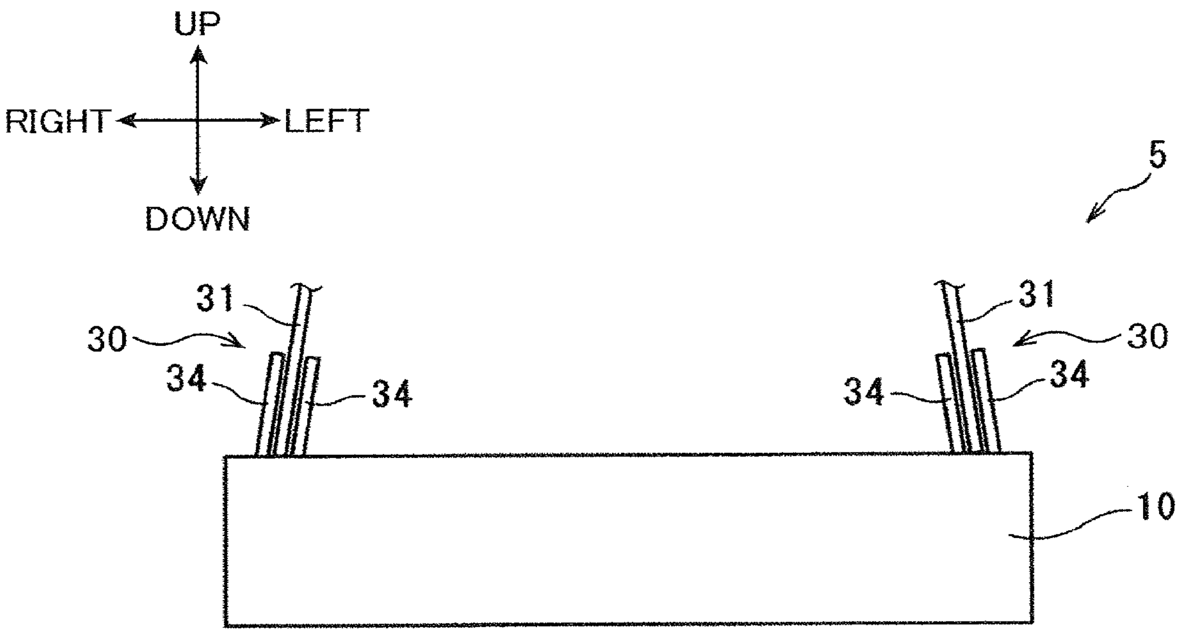
FIG. 7 is a schematic front view illustrating second connection parts different from the second connection part illustrated in FIG. 3.

The description on the embodiment is made for the exemplary case in which the guide of the second connection part of the hoisting implement swings in a vertical plane. However, as in the hoisting implement 5 illustrated in FIG. 7, the links 31 of a pair of second connection parts 30 (the second connection part of the first set and the second connection part of the second set) disposed to oppose each other along the right-left direction may each be supported by the swing supporting portion so that the swing surfaces of the links 31 tilts toward the center (inner side), in the width direction, from a direction vertical to the top face of the mast 10 (up-down direction). Since the mast 10 is generally hoisted from a single point using the hoisting tool, the swing surface (upper side of the swing surface) of the link 31 tilted toward the center, in the width direction, of the mast 10 makes it easy to align the link 31 and the hoist rope. This allows the link 31 to swing smoothly. With the link 31 and the hoist rope 4 aligned, force acts on the link 31 only along the longitudinal direction of the link 31, so that no bending force or the like acts on the link 31. Thus, designing of the hoisting implement 5 is easy. In addition, the link 31 is required to have less strength, which allows the link 31 to be made thinner. Thus, the hoisting implement 5 can be made small in size and light in weight. In FIG. 7, the part equivalent to that in FIGS. 2 to 4 is appended with the same reference sign.

The description on the embodiment is made for the case in which the fixing member of the second connection part of the hoisting implement is located further to the center of gravity of the mast from the swing supporting portion of the link in the side view. However, the fixing member may be located opposite to the center of gravity with respect to the swing supporting portion. In this case, the swing angle exceeds 90° when the link and the hoist rope are aligned. Thus, such a stopper is not provided that restricts the swing angle of the link from the top face of the mast to be 90° or less relative to the fixing member side.

The description on the embodiment is made for the case in which the hoisting implement includes a pair of first connection parts and a pair of second connection parts, each pair being provided at both sides of the mast so as to overlap in the side view. However, the configurations of the first connection parts and the second connection parts of the hoisting implement are not limited to the described configuration. For example, when the long object (mast) has a small width, the first connection part and the second connection part may each be provided at the center, in the width direction, of the long object.

The description on the embodiment is made for the case in which the first connection part and the second connection part of the hoisting implement are provided on the top face side of the mast. However, the first connection part and the second connection part may be provided at different places, such as an outer portion, in the width direction, or the bottom face of the long object (mast). When the long object is formed with beams or the like, the first connection part and the second connection part may be provided on the inner faces of the outermost beams, in the width direction. In a view point of easiness of attaching, operating, or the like, it is preferable that the first connection part and the second connection part are provided on the top face side. In particular, the second connection part is preferably provided on the top face side. For a long object with a thin top face, such as a gantry, it is preferable that the first connection part and the second connection part are provided on side faces in a view point of strength.

The description on the embodiment is made for the hoisting implement system in which the distance between the hoisting tool and the first connection part of the hoisting implement is equal to the distance between the hoisting tool and the second connection part of the hoisting implement when the mast is hoisted. However, it is not essentially required that the distance between the hoisting tool and the first connection part of the hoisting implement is equal to the distance between the hoisting tool and the second connection part of the hoisting implement. The hoisting implement can be used even when the distance between the hoisting tool and the first connection part of the hoisting implement is not equal to the distance between the hoisting tool and the second connection part of the hoisting implement. In this case, the hoisting angle is adjusted by the locations of the first connection part and the second connection part of the hoisting implement, and the length of the link, and in addition, the distance between the hoisting tool and the first connection part of the hoisting implement and the distance between the hoisting tool and the second connection part of the hoisting implement.

The description on the embodiment is made for the hoisting implement system in which the mast is hoisted in the horizontal posture when the link of the second connection part of the hoisting implement is set to the swingable state, and the mast is hoisted with its front side raised by the desired angle when the link of the second connection part is set to the fixed state. However, the angle of the mast corresponding to each state of the link is not limited to those described above. It may be configured in the opposite manner. In the method for using such a hoisting implement system, when the mast still on the trailer, after transportation, is to be attached to the construction machine body, the distal side of the link is fixed to the mast in the setting step, and when the mast removed from the construction machine body is to be loaded on the trailer, the link is set to the state in which the link is allowed to swing about its proximal side in the setting step.

As described above, the hoisting implement and the hoisting implement system of the present invention can change the hoisting posture of the long object with a simple and light-weight configuration. Accordingly, use of the method for using the hoisting implement system using the hoisting implement and the hoisting implement system of the present invention minimizes a possibility of occurrence of operational errors.

The description is made for the embodiment in which the hoist rope 4 includes the first end and the second end opposite to the first end, the first end being connected to the first connection part, and the second end being connected to the second connection part. However, the hoist rope is not always used in the configuration described above. That is, in addition to connecting the first end of a single hoist rope to the first connection part and the second end to the second connection part as described above, it may be configured that the first end of one of a plurality of hoist ropes is connected to the hoisting tool 3 (hook of an auxiliary crane) and the second end of the hoist rope is connected to the first connection part while the first end of another hoist rope is connected to the hoisting tool 3 and the second end of the hoist rope is connected to the second connection part. It may also be configured that the first end of one of a plurality of hoist ropes is connected to the first connection part provided at one side, in the right-left direction (width direction), and the second end of the hoist rope is connected to the first connection part provided at the other side, in the right-left direction, while the first end of another hoist rope is connected to the second connection part provided at one side, in the right-left direction, and the second end of the hoist rope is connected to the second connection part provided at the other side, in the right-left direction. Furthermore, the hoist rope may be used in a configuration different from those described above.

The present invention provides a hoisting implement used for hoisting a long object to be mounted on a construction machine using a hoist rope including a first end and a second end, the hoisting implement including at least one set of a first connection part and a second connection part disposed on the long object so that a center of gravity of the long object comes between the first connection part and the second connection part along a longitudinal direction of the long object, the first connection part and the second connection part each allowing the hoist rope to be connected to the long object, wherein the first connection part is fixed to the long object so that the first end of the hoist rope is connected to the first connection part, and the second connection part includes a link having a distal portion to which the second end of the hoist rope is allowed to be connected, and a proximal portion opposite to the distal portion, a swing supporting portion fixed to the long object to swingably support the proximal portion of the link, and a holding portion capable of detachably holding the distal portion of the link laid against the long object along the longitudinal direction of the long object.

In this configuration, the hoisting implement allows the link of the second connection part to swing about the proximal portion, and the swingable link serves as a portion of the hoist rope having an equivalently longer length. Meanwhile, the hoisting implement allows the distal portion of the laid link to be fixed to the long object by the holding portion. In the hoisting implement, when the link is laid and fixed, the link does not serve as a portion of the hoist rope, and thus the length of the hoist rope is its actual length. That is, the hoisting implement can change the hoisting posture of the long object by changing the equivalent length of the hoist rope, which change is made by switching the state of the link between the swingable state and the fixed state. In addition, in the hoisting implement, the hoisting posture of the long object can be changed while the hoist rope is kept fixed to the distal portion of the link, which requires no operation of detaching and attaching the hoist rope, and the operator only needs to select whether to allow swinging of the link or fix the link. Thus, the operation is easy and occurrence of operational errors can be prevented. Furthermore, since the hoisting implement is configured with the first connection part that allows the first end of the hoist rope to be fixed to the long object, and the second connection part including the link, the hoisting implement 1 has a simple structure and is light in weight.

In this configuration, it is desirable that the second connection part includes a pair of guides provided in a portion of the long object between the swing supporting portion and the holding portion, the guides opposing each other along a direction perpendicular to the longitudinal direction, and a pair of guides makes contact with the link laid against the long object, the guides sandwiching the link from both sides.

In this configuration, the second connection part includes a pair of plate-like guides along which the link swinging toward the laid position is guided. Thus, the operator can easily fix the distal portion of the laid link to the long object.

In this configuration, it is desirable that the holding portion is located closer to the center of gravity of the long object than the swing supporting portion is along the longitudinal direction.

In this configuration, when the link is allowed to swing, the distal portion of the link is kept stable toward the center of gravity. When the holding portion is located further to the center of gravity of the long object from the swing supporting portion in the side view as described above, the swing angle of the link from the top face of the long object will be less than 90°. Thus, for example, when the long object is placed on the ground and the hoist rope is loosened, the link easily returns under its own weight toward the holding portion, that is, to the position where the distal portion of the link can be fixed to the long object. This makes it easy to fix the distal portion of the laid link to the long object.

In this configuration, it is desirable that the second connection part further includes a stopper that restricts swinging of the link about the swing supporting portion so that the maximum rising angle of the link from the long object relative to the swing supporting portion is 90 degrees or less.

In this configuration, even when the holding portion is located further to the center of gravity of the long object from the swing supporting portion in the side view, when the link is allowed to swing, the swing angle of the link from the top face of the long object may incidentally exceed 90°. In such a case, the link does not easily return toward the holding portion under its own weight. In this regard, providing the second connection part with the stopper described above prevents the swing angle of the link from exceeding 90°, and further reliably allows the link to easily return to the position where the distal portion of the link can be fixed to the long object. This further makes it easier to fix the distal side of the laid link to the long object.

In this configuration, it is desirable that at least one set of the first connection part and the second connection part includes a first set of the first connection part and the second connection part and a second set of the first connection part and the second connection part, the first set being disposed on one of both end portions of the long object, in a width direction of the long object perpendicular to the longitudinal direction and an up-down direction, the second set being disposed on another end portion, and among the first connection part and the second connection part of the first set and the first connection part and the second connection part of the second set, the second connection parts are disposed to oppose each other along the width direction, and the links of the second connection parts are each supported by the swing supporting portion so that a swing surface of the link tilts to an inner side, in the width direction, from the up-down direction.

In this configuration, by disposing the first set and the second set of the second connection parts at both sides of the long object so that the second connection parts of the first set and the second set overlap each other in the side view, the long object that is wide in the width direction can also be hoisted in a stable manner. Since the long object is generally hoisted from a single point using the hoisting tool, the swing surfaces of the links tilted toward the center, in the width direction, of the long object makes it easy to align the link and the hoist rope, allowing the link to swing smoothly.

In this configuration, the long object is desirably a gantry or a mast to be mounted on a machine body of the construction machine. The hoisting implement of the present invention can preferably be used, in particular, for a gantry or a mast. Note that, the gantries and masts are long objects used for moving cranes.

Furthermore, the present invention provides a hoisting implement system for hoisting a long object to be mounted on a construction machine using a hoisting device, the hoisting implement system including a hoisting tool connected to the hoisting device and serving as an origin point of hoisting, the hoisting implement according to any one of the above, and a hoist rope connecting between the hoisting tool and the first connection part of the hoisting implement and a hoist rope connecting between the hoisting tool and the second connection part of the hoisting implement, wherein a distance between the hoisting tool and the first connection part of the hoisting implement and the distance between the hoisting tool and the second connection part of the hoisting implement are set to be equal to each other when the long object is hoisted.

In this configuration, the hoisting implement system using the hoisting implement can change the hoisting posture of the long object with a simple and light-weight configuration. When the long object is hoisted by the hoisting implement system, the distance between the hoisting tool and the first connection part of the hoisting implement is equal to the distance between the hoisting tool and the second connection part of the hoisting implement. That is, the hoisting implement system, configured to control the change in the hoisting posture of the long object only by the length of the link, makes the operation, including adjustment of the length of the hoist rope, easy and thus can prevent occurrence of operational errors.

As described above, the hoisting implement and the hoisting implement system of the present invention can change the hoisting posture of the long object with a simple and light-weight configuration. Accordingly, use of the method for using the hoisting implement system using the hoisting implement and the hoisting implement system of the present invention minimizes a possibility of occurrence of operational errors.

Furthermore, the present invention provides a method for using the hoisting implement system described above, the method including a connecting step of connecting the hoist rope to the hoisting implement, a link setting step of setting the link to one of a swingable state in which the distal portion is swingable about the proximal portion and a fixed state in which the distal portion is fixed to the long object, a first moving step of hoisting and moving the long object after the link setting step, a placing step of placing the long object on a ground after the first moving step, a switching step of switching, after the placing step, the state of the link from the state set in the link setting step to the other state among the swingable state and the fixed state, and a second moving step of hoisting again and moving the long object after the switching step.

Since the method for using the hoisting implement system uses the hoisting implement system of the present invention, the operation is made easy and occurrence of operational errors can be prevented.

The invention claimed is:

1. A hoisting implement used for hoisting a long object to be mounted on a construction machine using a hoist rope including a first end and a second end, the hoisting implement comprising:

at least one set of a first connection part and a second connection part disposed on the long object so that a center of gravity of the long object comes between the first connection part and the second connection part along a longitudinal direction of the long object, the first connection part and the second connection part each allowing the hoist rope to be connected to the long object, wherein the first connection part is fixed to the long object so that the first end of the hoist rope is connected to the first connection part, and the second connection part includes a link having a distal portion to which the second end of the hoist rope is allowed to be connected, and a proximal portion opposite to the distal portion, a swing supporting portion fixed to the long object to swingably support the proximal portion of the link, and a holding portion capable of detachably holding the distal portion of the link laid against the long object along the longitudinal direction of the long object.

2. The hoisting implement according to claim 1, wherein the second connection part includes a pair of guides provided in a portion of the long object between the swing supporting portion and the holding portion, the guides opposing each other along a direction perpendicular to the longitudinal direction, and the pair of guides makes contact with the link laid against the long object, the guides sandwiching the link from both sides.

3. The hoisting implement according to claim 1, wherein the holding portion is located closer to the center of gravity of the long object than the swing supporting portion is along the longitudinal direction.

4. The hoisting implement according to claim 3, wherein the second connection part further includes a stopper that restricts swinging of the link about the swing supporting portion so that a maximum rising angle of the link from the long object relative to the swing supporting portion is 90 degrees or less.

5. The hoisting implement according to claim 1, wherein the at least one set of the first connection part and the second connection part includes a first set of the first connection part and the second connection part and a second set of the first connection part and the second connection part, the first set being disposed on one of both end portions of the long object, in a width direction of the long object perpendicular to the longitudinal direction and an up-down direction, the second set being disposed on another end portion, and among the first connection part and the second connection part of the first set and the first connection part and the second connection part of the second set, the second connection parts are disposed to oppose each other along the width direction, and the links of the second connection parts are each supported by the swing supporting portion so that a swing surface of the link tilts to an inner side, in the width direction, from the up-down direction.

6. The hoisting implement according to claim 1, wherein the long object is a gantry or a mast to be mounted on a machine body of the construction machine.

7. A hoisting implement system for hoisting a long object to be mounted on a construction machine using a hoisting device, the hoisting implement system comprising:

a hoisting tool connected to the hoisting device and serving as an origin point of hoisting;

the hoisting implement according to claim 1; and a hoist rope connecting between the hoisting tool and the first connection part of the hoisting implement and a hoist rope connecting between the hoisting tool and the second connection part of the hoisting implement, wherein a distance between the hoisting tool and the first connection part of the hoisting implement and a distance between the hoisting tool and the second connection part of the hoisting implement are set to be equal to each other when the long object is hoisted.

8. A method for using the hoisting implement system described in claim 7, the method comprising:

a connecting step of connecting the hoist rope to the hoisting implement;

a link setting step of setting the link to one of a swingable state in which the distal portion is swingable about the proximal portion and a fixed state in which the distal portion is fixed to the long object;

a first moving step of hoisting and moving the long object after the link setting step;

a placing step of placing the long object on a ground after the first moving step;

a switching step of switching, after the placing step, the state of the link from the state set in the link setting step to the other state among the swingable state and the fixed state; and a second moving step of hoisting again and moving the long object after the switching step.

* * * * *